(12) United States Patent
Akiyama et al.

(10) Patent No.: US 8,322,961 B2
(45) Date of Patent: Dec. 4, 2012

(54) FIXING ASSEMBLY

(75) Inventors: Takashi Akiyama, Tokyo (JP);
Masahiro Aigami, Tokyo (JP); Yasushi Nakagawa, Tokyo (JP); Kunitaka Kobayashi, Tokyo (JP); Susumu Hayashi, Tokyo (JP); Takao Houjyou, Tokyo (JP)

(73) Assignee: Max Co., Ltd., Tokyo (JP)

( * ) Notice: Subject to any disclaimer, the term of this patent is extended or adjusted under 35 U.S.C. 154(b) by 604 days.

(21) Appl. No.: 12/519,425

(22) PCT Filed: Dec. 18, 2007

(86) PCT No.: PCT/JP2007/074339
§ 371 (c)(1),
(2), (4) Date: Jun. 16, 2009

(87) PCT Pub. No.: WO2008/075693
PCT Pub. Date: Jun. 26, 2008

(65) Prior Publication Data
US 2010/0072337 A1 Mar. 25, 2010

(30) Foreign Application Priority Data

Dec. 18, 2006 (JP) ................................. 2006-340591
Feb. 14, 2007 (JP) ................................. 2007-033822
May 25, 2007 (JP) ................................. 2007-139036

(51) Int. Cl.
*F16B 15/00* (2006.01)
(52) U.S. Cl. ......................................... 411/441
(58) Field of Classification Search .................. 411/440, 411/441
See application file for complete search history.

(56) References Cited

U.S. PATENT DOCUMENTS

| 2,961,210 | A | * | 11/1960 | Pfaff et al. | .................... | 248/74.5 |
| 3,289,522 | A | * | 12/1966 | Bell | ............................ | 411/371.2 |
| 3,516,323 | A | * | 6/1970 | O'Brien | ......................... | 411/441 |
| 4,028,986 | A | * | 6/1977 | Beton | ............................ | 411/440 |
| 6,162,002 | A | * | 12/2000 | Rohrmoser et al. | ........... | 411/441 |
| 6,688,829 | B1 | * | 2/2004 | Popovich et al. | .............. | 411/441 |
| 7,093,338 | B2 | | 8/2006 | Powers et al. | | |
| 2003/0201373 | A1 | | 10/2003 | Masas | | |
| 2006/0078405 | A1 | * | 4/2006 | Buytaert et al. | ............... | 411/441 |
| 2007/0053768 | A1 | * | 3/2007 | Durig | ............................ | 411/441 |

FOREIGN PATENT DOCUMENTS

| EP | 0 676 551 A2 | 10/1995 |
| EP | 0 702 159 A2 | 3/1996 |
| EP | 1 538 345 | 6/2005 |
| JP | 50-151513 | 12/1975 |
| JP | 52-53551 | 12/1977 |
| JP | 58-104410 | 7/1983 |
| JP | 60-56809 | 4/1985 |

* cited by examiner

*Primary Examiner* — Flemming Saether
(74) *Attorney, Agent, or Firm* — Drinker Biddle & Reath LLP

(57) ABSTRACT

A fixing assembly is adapted to be secured to a workpiece with a fastener that is struck out from a nose part of a nailer. The fixing assembly includes a fixing formed with an insertion hole through which the fastener is to be inserted, and a guide member. The guide member includes a base part fixed to the insertion hole, and a guide part adapted to be elastically engaged with the nose part. An outer diameter of a distal end portion of the guide part is larger than an inner diameter of the nose part.

18 Claims, 15 Drawing Sheets

US 8,322,961 B2

FIXING ASSEMBLY

TECHNICAL FIELD

The present invention relates to a fixing assembly which is used for hanging or securing an object to be supported, such as an electric cable or a washer, with respect to a workpiece, such as a concrete.

BACKGROUND ART

Generally, when hanging an object to be supported on a concrete ceiling during an installation of an air-conditioning system or the like, firstly, a fixing is secured to the concrete ceiling. A full thread bolt is screwed into this fixing, and the object to be supported is hung on the full thread bolt. In order to secure the fixing to the concrete ceiling, a hole is preliminarily formed in the fixing. A fastener is struck with a nailer, targeting this hole, to secure the fixing with the fastener.

However, it is very difficult to strike the fastener with the nailer directed to the ceiling, targeting the hole of the fixing from below.

Accordingly, there is a fixing assembly in which a metal piece having a cylindrical part is attached to a hole of a fixing, and a fastener is struck along an interior of the cylindrical part so that the fastener is easily struck into a surface of a workpiece (see, e.g., JP 52-53551 Y).

Further, there is a fixing assembly in which a synthetic resin guide member is attached to a holed portion of a fixing so that the hole can be easily targeted (see, e.g., EP 1 538 345 A1). This guide member is formed with a receiving groove around the hole to receive a circular tip portion of a nailer. By engaging the tip portion of the nailer with inner and outer groove walls of the receiving groove, it is possible to strike the fastener in a state in which the distal end portion is in a stable condition at a right position.

Further, there is a fixing assembly in which a synthetic resin resilient guide having a disc-shape is attached to a hole of a fixing (see, e.g., U.S. Pat. No. 7,093,338 B2). It is possible to strike a fastener in a state in which a cylindrical part at a tip of a nailer is fitted onto an outer side of this disc-shaped guide.

However, in all of the fixing assemblies described above, when striking a fastener, the guide member is stuck between the fixing and the fastener and becomes an obstacle, resulting in a reduced penetrating amount of the fastener.

Moreover, a surface of the fixing that faces a workpiece is flat. Therefore, in a case in which the entire surface that faces the workpiece is brought into contact with a surface of the workpiece, especially with respect to a concrete workpiece or the like that has a rough surface, the fixing is unstable and is likely to incline.

DISCLOSURE OF THE INVENTION

One or more embodiments of the present invention provide a fixing assembly which can be reliably held by a nose part at a tip of a nailer to favorably guide a striking of a fastener, and which can be stably secured to a workpiece.

According to one or more embodiments of the present invention, a fixing assembly is adapted to be secured to a workpiece with a fastener that is struck out from a nose part of a nailer. The fixing assembly includes a fixing formed with an insertion hole through which the fastener is to be inserted, and a guide member. The guide member includes a base part fixed to the insertion hole, and a guide part adapted to be elastically engaged with the nose part. An outer diameter of a distal end portion of the guide part is larger than an inner diameter of the nose part.

Other aspects and advantages of the present invention will be apparent from the following description, the drawings and the claims.

EXPLANATION OF REFERENCE NUMERALS

10 Hanging Bracket
20 Guide Member
40 Fastener
31 Outer Nose Portion
32 Inner Nose Portion

BEST MODE FOR CARRYING OUT THE INVENTION

Hereinafter, embodiments of the present invention will be described in detail with reference to the drawings.

First Embodiment

Figure 1:
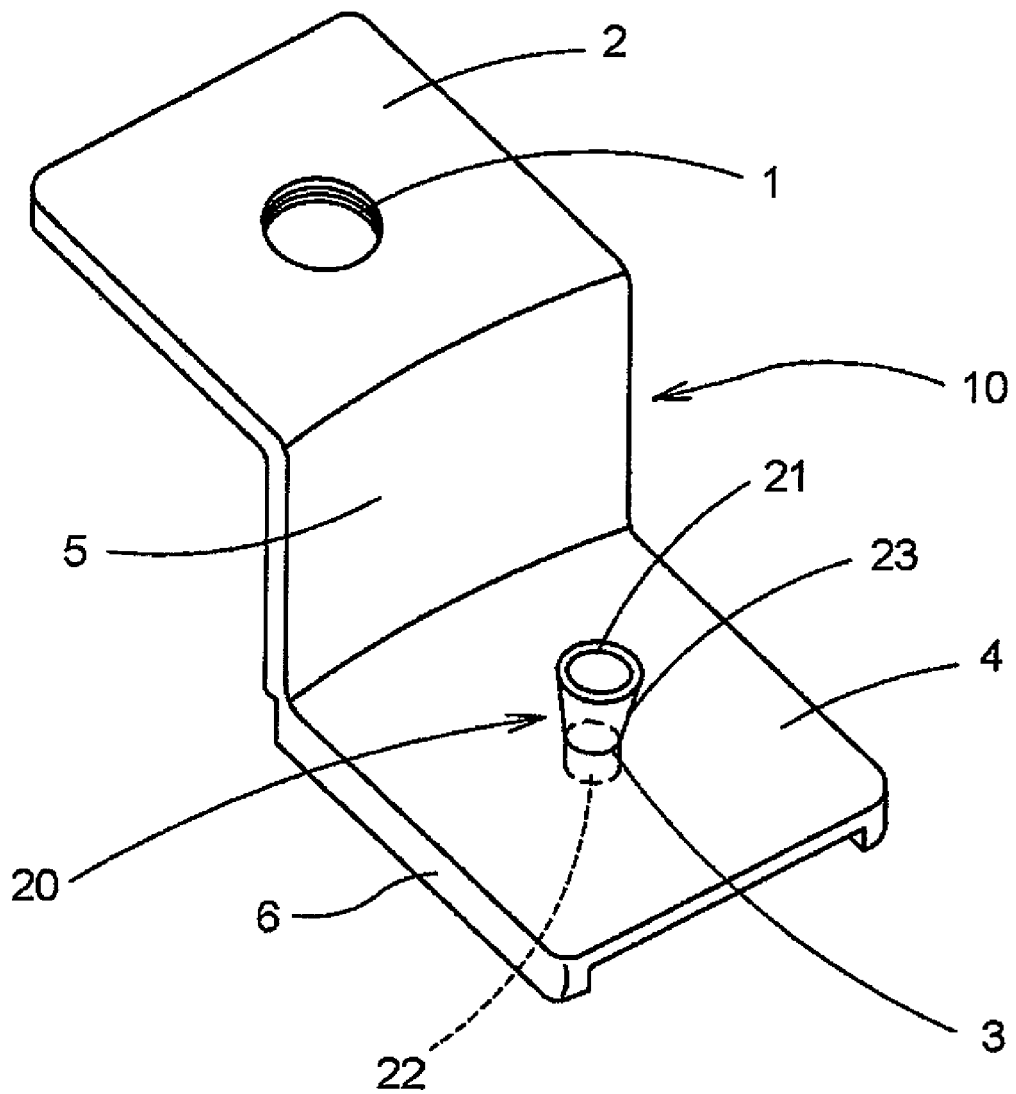
FIG. 1 is a perspective view of a fixing assembly according to a first embodiment of the present invention.

As shown in FIG. 1, a fixing assembly includes a hanging bracket 10 and a guide member 20. The hanging bracket 10 is a metallic fixing formed in a Z-shape. The hanging bracket 10 includes a mounting part 2 formed with a threaded hole 1, a securing part 4 formed with an insertion hole 3 through which a fastener is to be inserted, and a step part 5 connecting the mounting part 2 and the securing part 4. The guide member 20 is attached to the insertion hole 3.

The guide member 20 is made of synthetic resin and has an elasticity. The guide member 20 includes a base part 22 fitted and fixed to the insertion hole 3 and a guide part 23 formed in a flared shape. The base part 22 may be fixed to the insertion hole 3 by tightly fitting, adhesive bonding, caulking, or compression bonding.

An outer diameter of a distal end of the guide member 20 is configured to have such a size that it is fitted in a slightly tight manner inside a distal end portion of a fastener ejecting nose part of a nailer.

A guide hole 21, an inner diameter of which at the distal end portion is larger than an outer diameter of a shaft portion of the fastener, is formed through an inner side (a center side) of the guide member.

Two rib-shaped protrusions 6 are formed on a surface of the securing part 4 that faces the workpiece.

Figure 2:
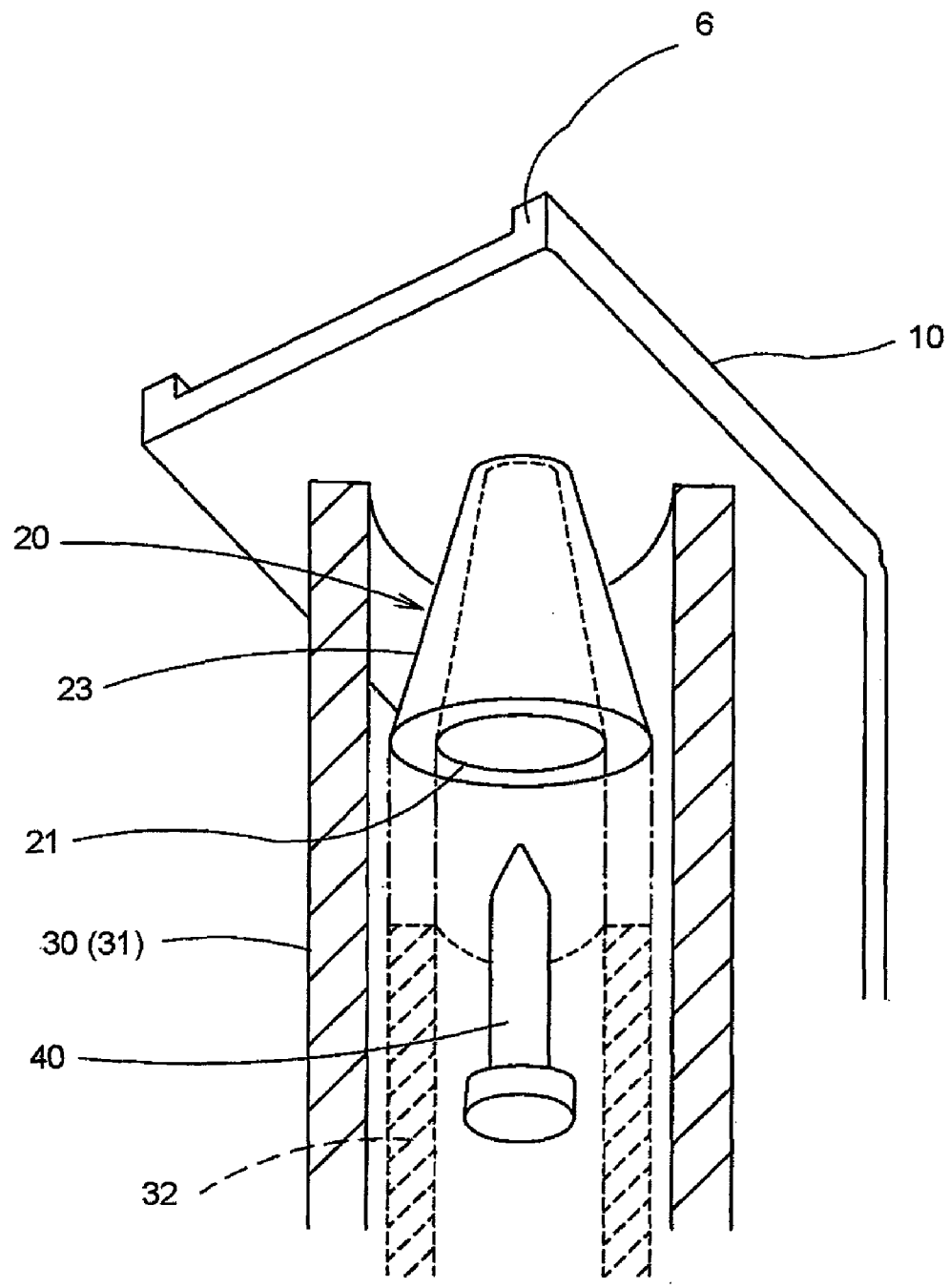
FIG. 2 is a perspective view illustrating a state in which a nose part of a nailer is fitted onto a guide part.

Next, a usage example of the hanging bracket 10 will be described. Firstly, the hanging bracket 10 is held with one hand, and the guide member 20 is fitted into the cylindrical nose part 30 which is provided at the tip of the nailer. In this manner, the hanging bracket 10 is held at a distal end of the nose part 30. Thereafter, as shown in FIG. 2, the hanging bracket 10 is directed upward, and the fastener 40 is struck into a surface of the workpiece, such as a concrete ceiling, with the nailer. Accordingly, the hanging bracket 10 can be safely and reliably secured with a simple striking operation.

Figure 3:
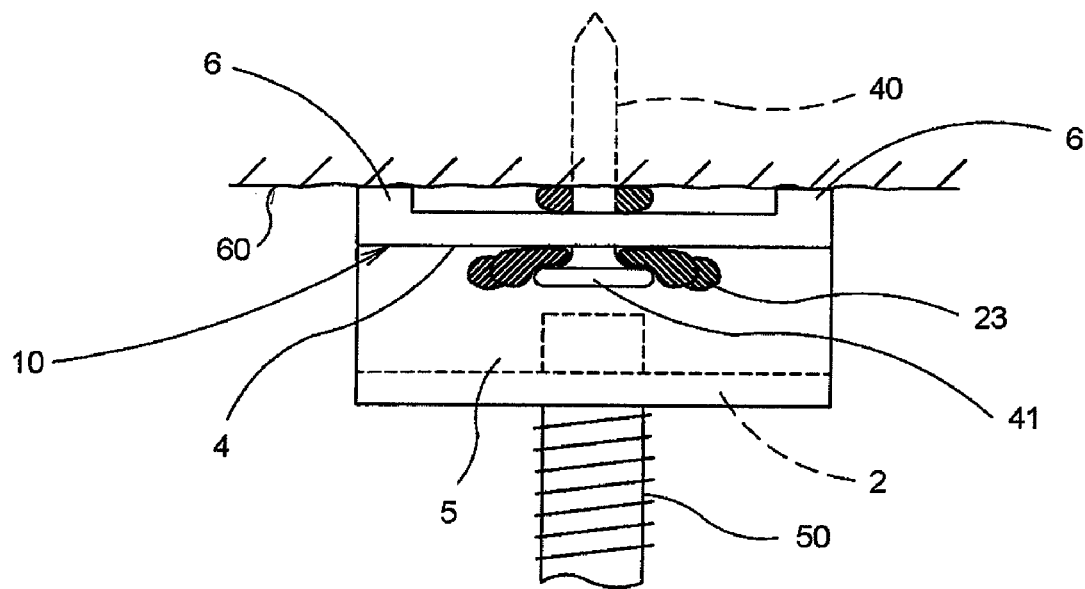
FIG. 3 is a front view illustrating a state in which a fixing is secured to a workpiece.

The fastener 40 ejected from the nailer is taken in and guided by the distal end portion of the guide hole 21, and is struck into the insertion hole 3 of the hanging bracket 10. Because the guide part 23 is formed in a flared shape, the guide part 23 is outwardly pushed and spread by the fastener 40 entered therein, and is squashed. The squashed guide part 23 escapes toward a space between a head portion 41 of the fastener 40 and the nose part 30 and, as a result, is brought into a state shown in FIG. 3. In a case in which the distal end of the nose part 30 is formed in a waveform or the like, the guide part 23 further escapes outward through a gap between the distal end of the nose part 30 and the hanging bracket 10. Therefore, the nose part 30 of the nailer and the fastener 40 are favorably guided, and the squashed guide part 23 does not obstruct the striking of the fastener 40. Thus, it is possible to reliably secure the hanging bracket 10.

When the hanging bracket 10 is brought into contact with the surface 60 of the workpiece, it is the two rib-shaped protrusions 6 on the securing part 4 that directly come into contact with the surface. Accordingly, a contact area is small. Therefore, even if the surface 60 of the workpiece is a rough concrete surface, the orientation of the hanging bracket 10 is stable. As a result, it is possible to accurately and reliably hang and hold an object to be supported with respect to a screw 50 that is screwed into the threaded hole 1 of the mounting part 2.

As shown in FIG. 2, in a case in which the nailer has a duplex configuration including an outer nose portion 31 which is provided so as to be relatively movable in a striking direction of the fastener 40 with respect to a body of the nailer and an inner nose portion 32 (illustrated in dotted lines) which is fixed to the body of the nailer, it is preferable that the outer diameter of the distal end of the guide member 20 be substantially equal to or slightly larger than an inner diameter of the outer nose portion 31, and that the inner diameter of the distal end of the guide hole 21 be substantially equal to an inner diameter of a distal end of the inner nose portion 32.

Figure 4:
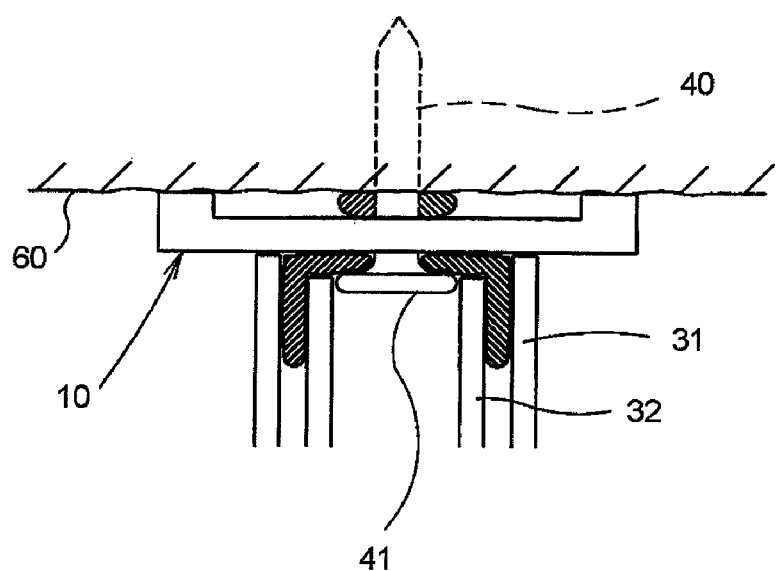
FIG. 4 is a front view illustrating a state the fixing is secured to the workpiece with a nailer having a duplex configuration.

When striking the fastener with the configuration described above, firstly, the fixing assembly is held by fitting the distal end of the guide member 20 into the outer nose portion 31. Thereafter, the distal end of the outer nose portion 31 is set, together with the hanging bracket 10, against a certain location on the surface 60 of the workpiece. Further, the inner nose portion 32 is pressed, together with the body of the nailer, against the certain location, whereby the distal end of the inner nose portion 32 presses and squashes the distal end of the guide part 23. Further, when the fastener 40 is struck, the fastener 40 is ejected being guided by the guide part 23. At this time, as shown in FIG. 4, the guide part 23 is squashed so as to spread around the head portion 41 of the fastener 40. Therefore, the guide part 23 does not become and obstacle by being stuck between the hanging bracket 10 and the fastener 40 so that the penetrating amount of the fastener 40 does not become short.

Figure 5:
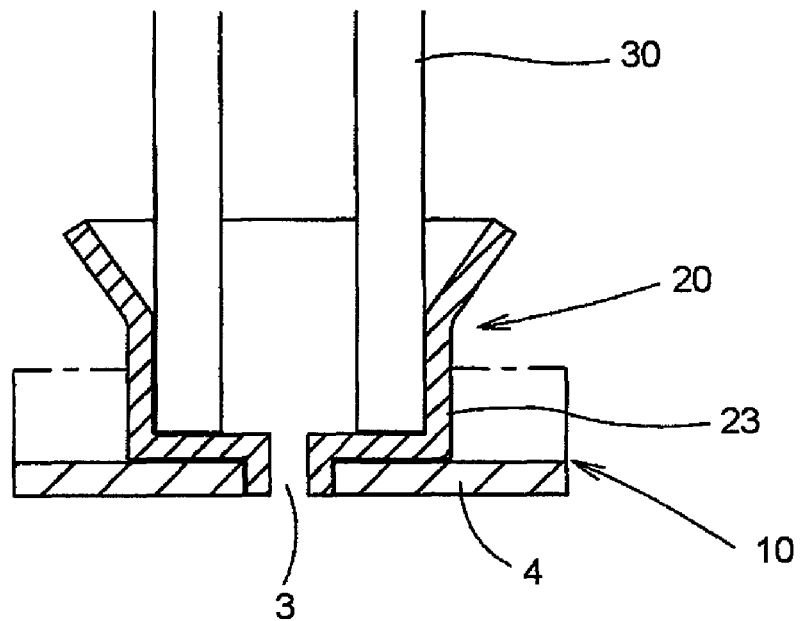
FIG. 5 is a perspective view of another example of a guide member.

As shown in FIG. 5, the guide part 23 of the guide member 20 may be formed in a short cylindrical shape having such a size that it can be fitted onto the distal end portion of the nose part 30 of the nailer in a slightly tight manner from the outer side. In this case, the distal end portion of the guide part 23 is formed slightly wide.

When striking the fastener with the configuration described above, firstly, the fixing assembly is held by fitting the distal end of the guide member 20 onto the outer side of the nose part 30. Thereafter, the distal end of the nose part 30 is set, together with the hanging bracket 10, against a certain location on the surface 60 of the workpiece, and then the fastener 40 is struck. In this case, most parts of the guide member 23 are located outside the nose part 30. Therefore, when striking the fastener 40 toward the surface 60 of the workpiece, the guide member 20 does not obstruct the striking of the fastener 40.

Figure 6:
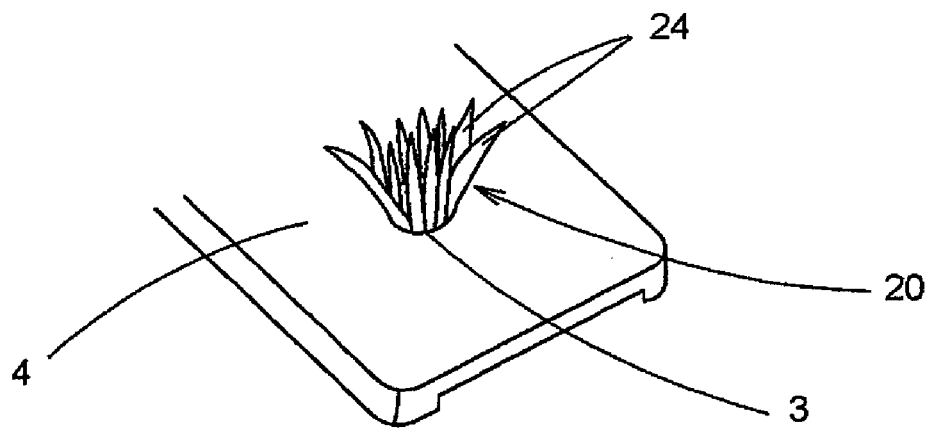
FIG. 6 is a perspective view of yet another example of the guide member.

Moreover, as shown in FIG. 6, the guide part 23 of the guide member 20 may be configured such that a number of projecting pieces 24 spread obliquely and radially from the insertion hole 3 for the fastener 40. According to this configuration, when striking the fastener 40, the projecting pieces 24 easily spread around the insertion hole 3. Therefore, there are no such disadvantages that the resin-made projecting pieces 24 become an obstacle by being stuck between the hanging bracket 10 and the head portion 41 of the fastener 40 and that the penetrating amount of the fastener 40 is reduced.

Figure 7A:
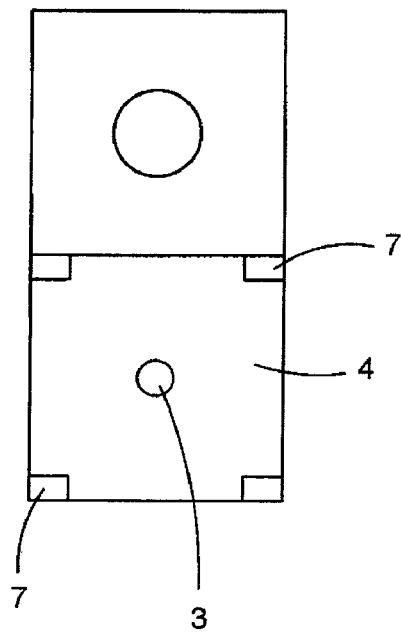
FIG. 7A is a back view of another example of the fixing.
Figure 7B:
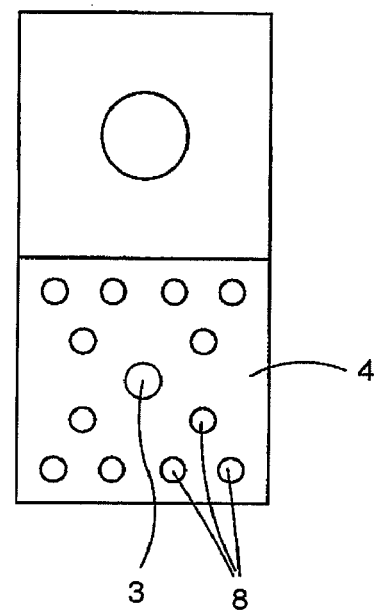
FIG. 7B is a back view of yet another example of the fixing.

The protrusions to be formed on the securing part 4 of the hanging bracket 10 are not limited to the rib-shaped protrusions 6. The protrusions may be, as shown in FIG. 7A, protrusions 7 which are formed to protrude from the four corners of the surface of the securing part 4 that faces the workpiece or, as shown in FIG. 7B, a number of grainy protrusions 8. According to these configurations, when the securing part 4 is brought into contact with the surface of the workpiece, it is the protrusions that directly come into contact with the surface in a point manner or in a linear manner. Thus, the contact area with respect to the surface of the workpiece is small. Therefore, even the surface of the workpiece is a rough concrete surface, the hanging bracket 10 can be stably attached.

Figure 10:
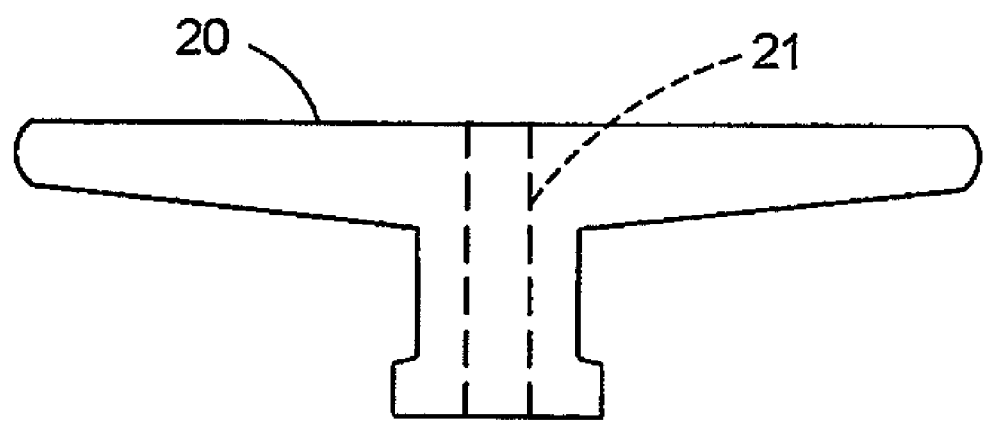
FIG. 10 is a front view of yet another example of the guide member.

While the guide member 20 of first embodiment has the guide part 23 of a flared shape, the guide member 20 may be in a form of a disc-shaped member provided with a guide hole 21 as shown in FIG. 10.

Second Embodiment

Figure 11:
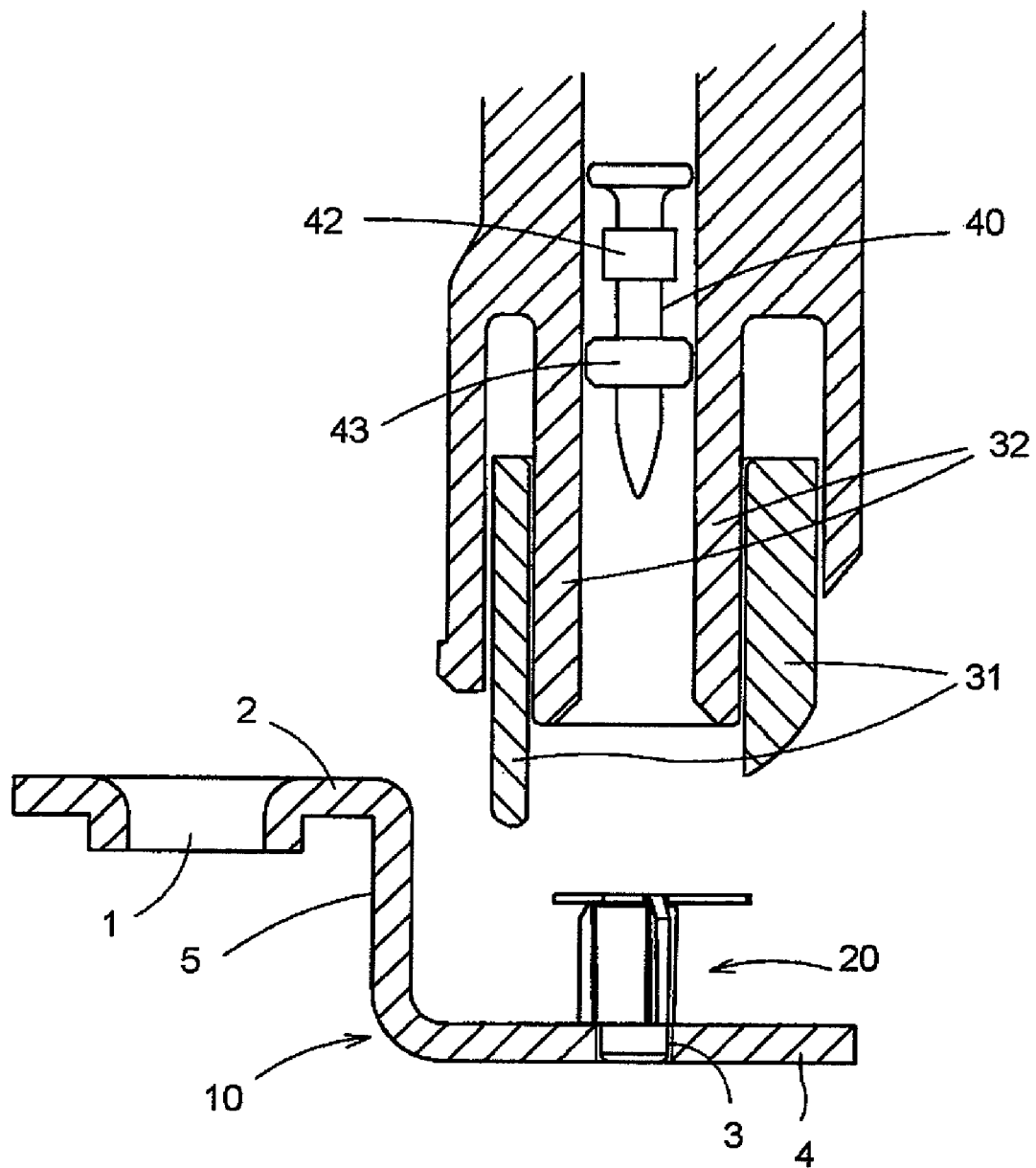
FIG. 11 is a sectional view illustrating a fixing assembly according to a second embodiment of the present invention and a tip portion of a nailer.

FIG. 11 illustrates a fixing assembly according to second embodiment of the present invention and a distal end portion of a nailer. Like the first embodiment, the fixing assembly includes a hanging bracket 10 (the fixing) and a guide member 20. The nailer strikes a fastener 40 toward the hanging bracket 10. The nailer has a duplex configuration including a cylindrical outer nose portion (a contact top) 31 provided so as to be relatively movable with respect to a body of the nailer in a striking direction of the fastener 40 and a cylindrical inner nose portion 32 fixed to the body of the nailer. The fastener 40 is equipped with a connecting member 42 for connection to other fasteners and a guide 43 which prevents the fastener 40 from being inclined inside the inner nose portion 32. The connecting member 42 and the guide 43 are both made of synthetic resin.

The inner nose portion 32 has an ejection port for the fastener 40 and is integrally formed with the body of the nailer. The outer nose portion 31 is provided on an outer side of the inner nose portion 32, at a distal end of a contact arm (not shown) which is disposed so as to be slidable in the striking direction of the fastener 40. The outer nose portion 31 is biased by a spring so as to project from the distal end of the inner nose portion 32. When the outer nose portion 31 is pressed against the surface 60 of the workpiece such as a concrete ceiling, the outer nose portion 31 relatively retracts against the biasing of the spring, and comes into contact with the surface 60 of the workpiece together with the distal end of the inner nose portion 32.

Figure 17:
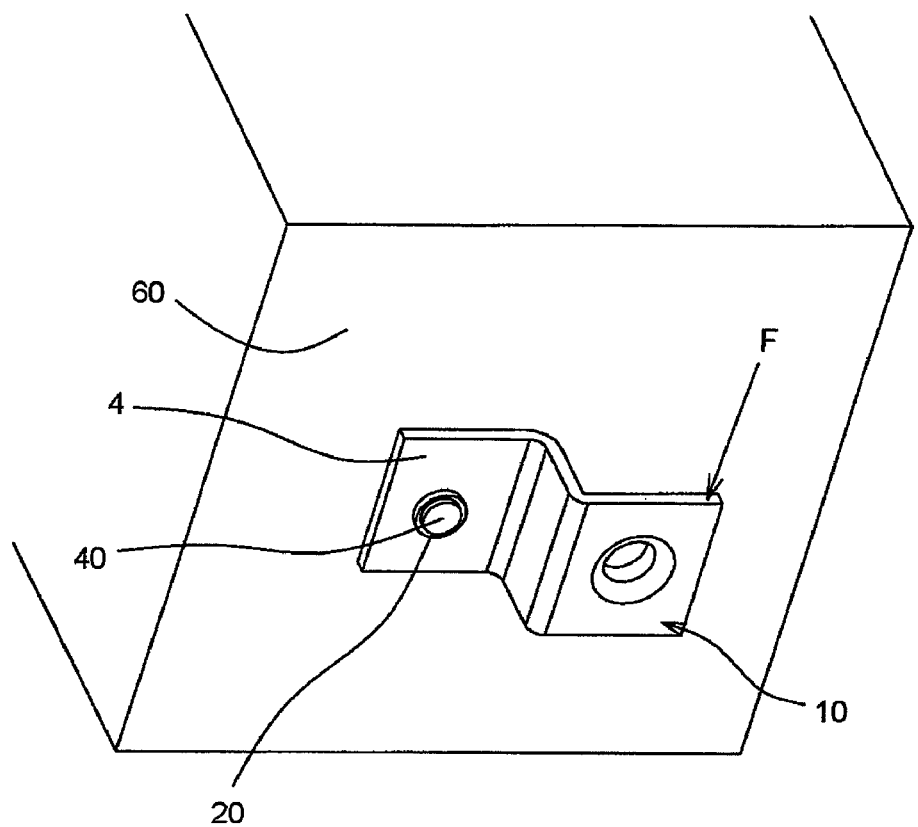
FIG. 17 is a perspective view illustrating a fixing secured to the workpiece.

The hanging bracket 10 is made of metal and is formed in a Z-shape. As shown in FIG. 17, the hanging bracket 10 includes a mounting part 2 formed with a threaded hole 1, a securing part 4 formed with an insertion hole 3 through which the fastener 40 is to be inserted, and a step part 5 connecting the mounting part 2 and the securing part 4. The guide member 20 is attached to the insertion hole 3 of the securing part 4.

Figure 12A:
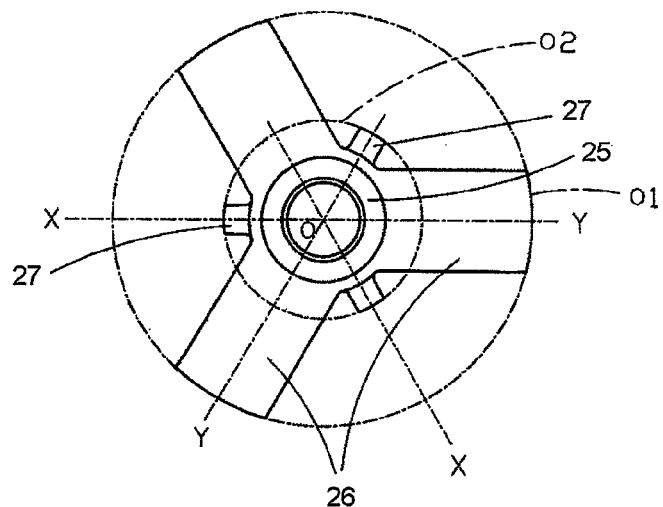
FIG. 12A is a plan view of a guide member according to the second embodiment.
Figure 12C:
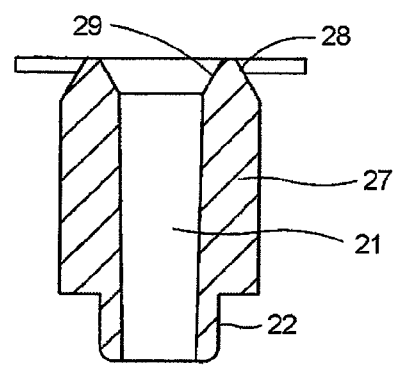
FIG. 12C is a sectional view taken along the line X-O-X shown in FIG. 12A.
Figure 12B:
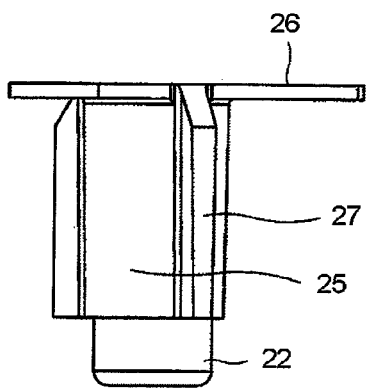
FIG. 12B is a side view of the guide member shown in FIG. 12A.
Figure 12D:
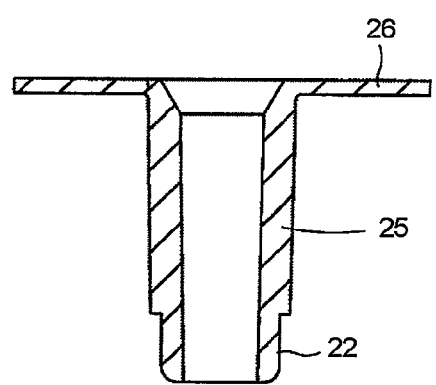
FIG. 12D is another sectional view taken along the line Y-O-Y shown in FIG. 12A.
Figure 13:
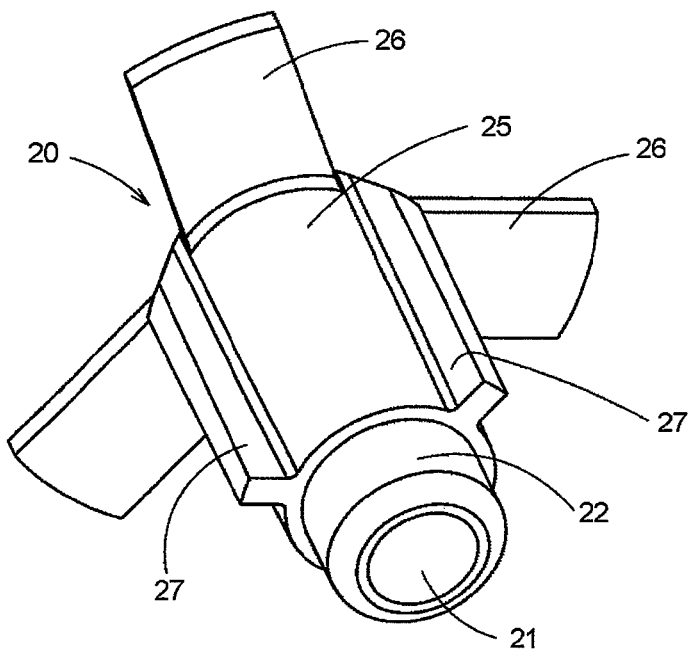
FIG. 13 is a perspective view of the guide member shown in FIG. 12A.

The guide member 20 is a synthetic resin member and has an elasticity. As shown in FIGS. 12A to 13, the guide member 20 includes a guide part (a guide shaft 25, guide vanes 26 and guide pieces 27) and a base part 22 fixed to the insertion hole 3. The base part 22 is formed on one end of the guide shaft 25. Three guide vanes 26 having flexibility are formed radially from the other end of the guide shaft 25. A circle O1 that connects distal ends of the guide vanes 26 has a larger diameter than an inner diameter of the outer nose portion 31 of the nailer.

A guide hole 21 is formed through a center of the guide shaft 25 to guide the fastener 40 ejected from the nailer. An inner inclined face 29 is formed at a distal end part of the guide hole 21 to guiding a tip of the fastener 40. The base part 22 is formed to have a slightly smaller diameter so that it can be fitted into the insertion hole 3.

The guide hole 21 may penetrate through the center of the guide shaft 25, or the base part 22 fitted into the insertion hole 3 may be solid. In order to enhance a verticality, it is preferable that the guide shaft 25 have a sufficient length (e.g., about 7 mm to 10 mm).

The plurality of rib-shaped guide pieces 27 are radially formed on an outer peripheral face of the guide shaft 25. A circle O2 that connects outer ends of the guide pieces 27 has a slightly smaller diameter than an inner diameter of the inner nose portion 32 (e.g., smaller by about 0.1 mm to 0.5 mm). An outer inclined part 28 is formed at a distal end of each of the guide pieces 27 to guide the distal end of the inner nose portion 32.

It is to be noted that each of the guide pieces 27 is not necessarily formed in a shape of a continuous rib and, for example, may be a plurality of protruded pieces or protrusions (not shown) formed along a longitudinal direction of the outer peripheral face of the guide shaft 25.

Figure 14:
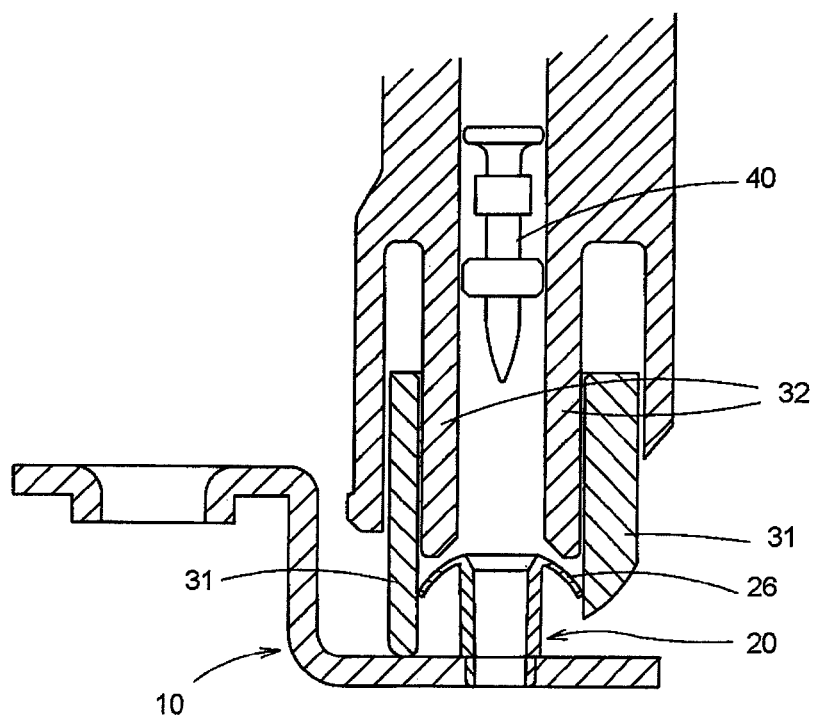
FIG. 14 is a sectional view illustrating a state in which the fixing assembly is held by an outer nose portion of the nailer.

When striking the fastener 40 with the configuration described above, firstly, the fixing assembly is attached to the nailer as shown in FIG. 14, by holding the hanging bracket 10 with a hand and by fitting the guide member 20 into the outer nose portion 31. At this time, the guide vanes 26 are flexed and bent from their base portions, and their distal ends obliquely engage with the inner face of the outer nose portion 31. Therefore, even if the hanging bracket 10 is maintained to be directed downward, the hanging bracket 10 is stably held without dropping from the outer nose portion 31 due to an elastic repulsive force and a check valve action of the guide vanes 26.

Figure 15:
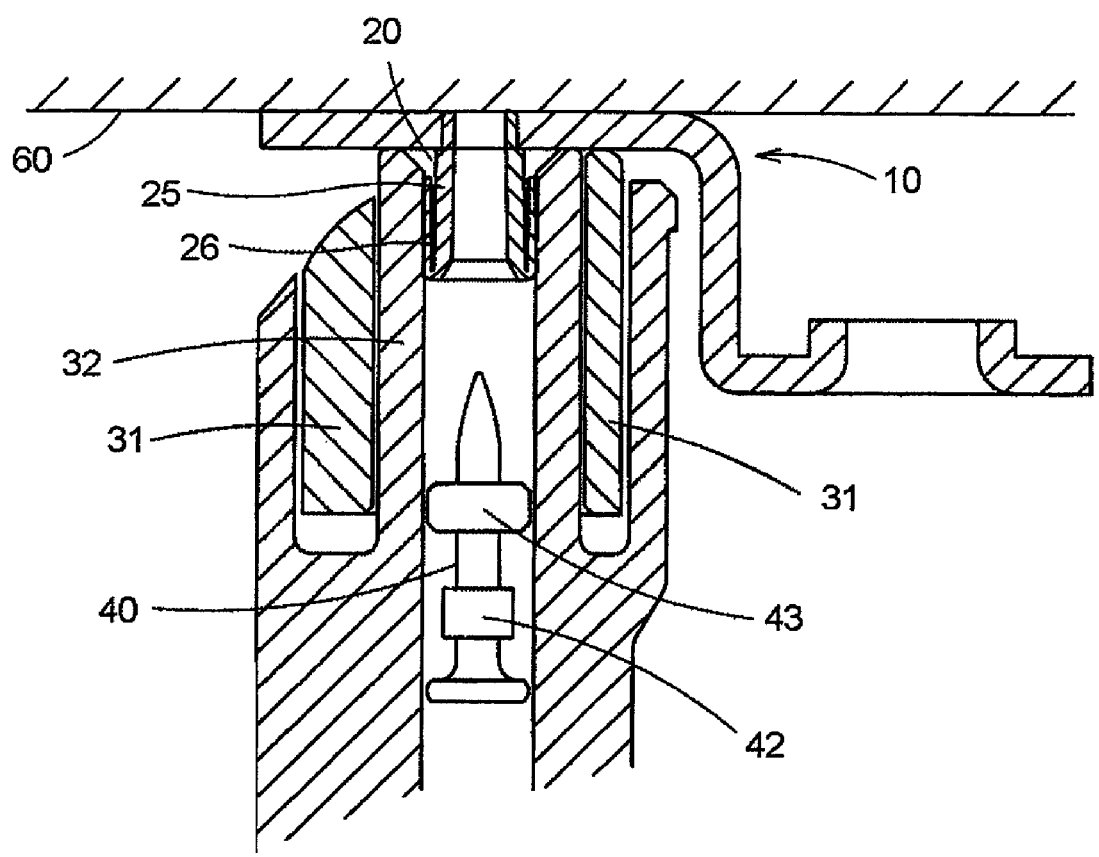
FIG. 15 is a sectional view illustrating a state in which the fixing assembly is pressed, together with the nailer, against a surface of the workpiece.
Figure 16:
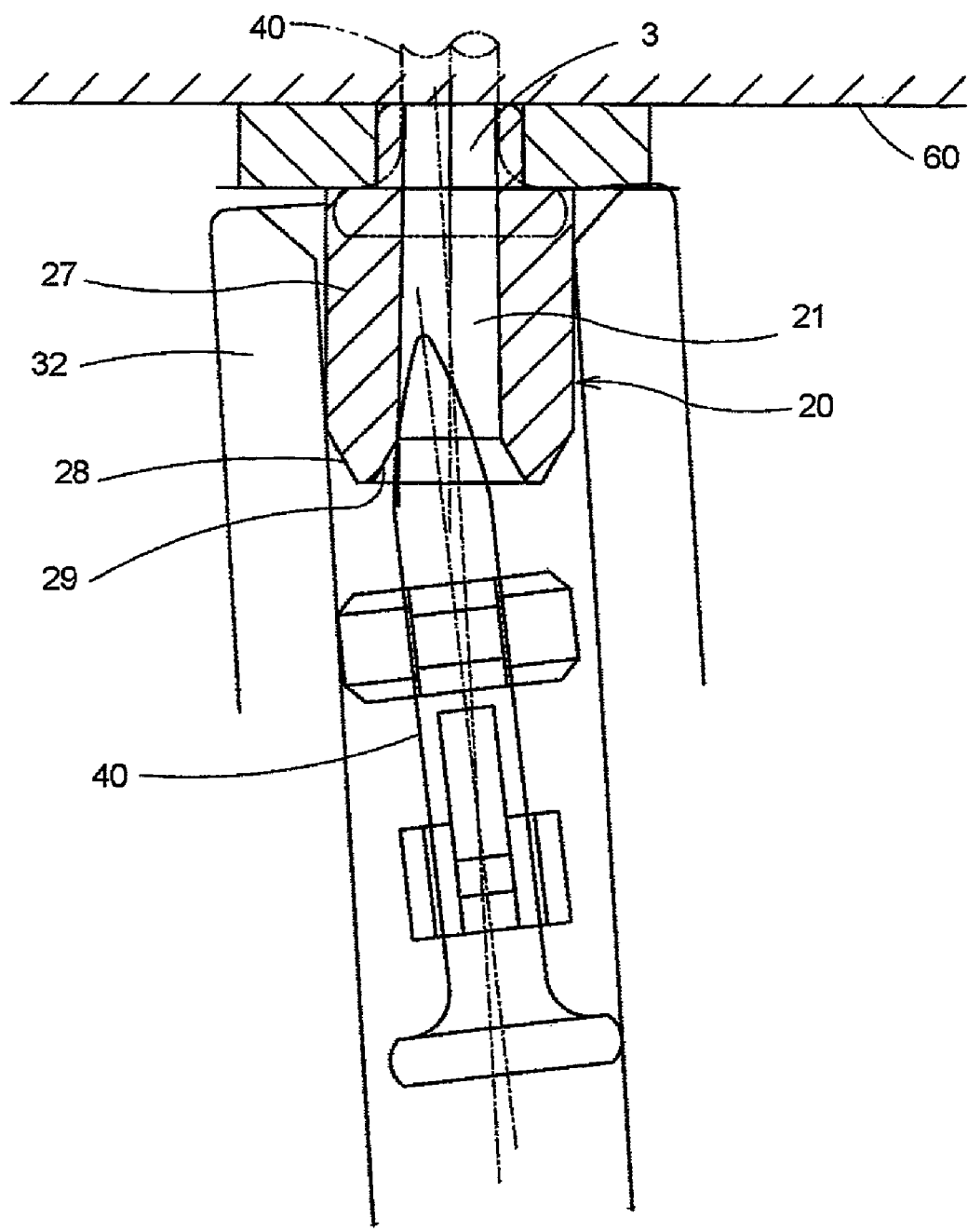
FIG. 16 is a sectional view illustrating a state in which a fastener is driven into the fixing assembly.

Next, as shown in FIG. 15, the distal end of the outer nose portion 31 is set, together with the hanging bracket 10, against a certain location on the surface 60 of the workpiece. Further, the nailer is upwardly pushed to strike the fastener 40. In this manner, the inner nose portion 32 is moved upward together with the nailer, and is brought into contact with the guide shaft 25. As shown in FIG. 16, the inner nose portion 32 is guided by the outer inclined parts 28 at the distal ends of the guide pieces 27, allowing the guide shaft 25 to be inserted into the inner nose portion 32. At the same time, the guide vanes 26 are folded and are also received inside the inner nose portion 32.

In this manner, the guide member 20 is maintained in a stable and immovable condition due to the elastic repulsive force of the guide vanes 26. Moreover, the center of the guide shaft 25 is positioned and is maintained by the guide pieces 27.

The guide shaft 25 is sufficiently long, and the diameter of the circle O2 that connects the outer ends of the guide pieces 27 is slightly smaller than the inner diameter of the inner nose portion 32. Accordingly, even if the inner nose portion 32 is pressed against the surface 60 of the workpiece not perpendicularly and in a slightly inclined state as shown in FIG. 16, the guide shaft 25 is maintained in a vertical condition.

Moreover, because each of the guide pieces 27 is formed between respective adjacent ones of the guide vanes 26, the guide vanes 26 and the guide pieces 27 do not interfere with each other so that they can fully fulfill their respective functions.

When the nailer is actuated, the fastener 40 is ejected from the inner nose portion 32, and hits the guide member 20. Although the fastener 40 is sometimes slightly inclined with respect to the inner nose portion 32 when it is ejected, the distal end of the fastener 40 is guided by the inner inclined faces 29 and enters into the guide hole 21 of the guide shaft 25. The fastener 40 passes through the guide hole 21, and is perpendicularly struck into the surface 60 of the workpiece through the insertion hole 3 of the securing part 4 of the hanging bracket 10. The head portion 41 of the fastener 40 remains on the securing part 4. FIG. 17 is a perspective view of the hanging bracket 10 which is secured to the surface 60 of the workpiece with the fastener 40. Objects to be fixed to the hanging bracket 10 may be an electric cable, a washer, a duct, a coolant pipe, etc.

Because the fastener can be struck in a state in which its verticality is maintained, a buckling, a striking failure and the like are unlikely to occur.

When the fastener 40 is struck, the inner face of the guide shaft 25 is spread, and the guide pieces 27 and the guide vanes 26 are also spread outward. However, because the inner nose portion 32 is moved away from the surface 60 of the workpiece due to a counteraction at the time of striking, most parts of the guide member 20 escape and spread toward the outer side of the insertion hole 3. Therefore, the most parts of guide member 20, except a flatly squashed part, do not remain between a back face of the head portion 41 of the fastener 40 and the securing part 4. Thus, the penetrating amount of the fastener 40 is sufficiently ensured. Because the guide shaft 25 of the guide member 20 is reinforced with the guide pieces 27, the verticality thereof is highly retained. Nevertheless, because a wall thickness of the guide shaft itself is small, rigidity against the outward spread is small. Therefore, a passing resistance when the fastener 40 passes through the guide hole 21 of the guide shaft 25 is very small. Accordingly, it is possible to firmly secure the hanging bracket 10 to the surface 60 of the workpiece with a small power loss.

The hanging bracket 10 is also applicable to a nailer of such a type that the nose part slides in the striking direction of the fastener. In this case, the guide member 20 is brought into a condition as shown in FIGS. 15 and 16. In this case, also, when the guide shaft 25 is fitted into the nose part of the nailer in a state in which the hanging bracket 10 is directed downward, the guide vanes 26 are flexed and bent from their base portions, and their distal end obliquely engage with the inner face of the nose part. As a result, the fixing assembly held is by the nose part of the nailer due to the elastic repulsive force and the check valve action of the guide vanes 26, and does not drop. Therefore, even when striking the fastener 40 into the workpiece with the hanging bracket 10 directed upward, the striking operation can be easily carried out. The guide shaft 25 is held at the center of the nose part with the guide vanes 26. The fastener 40 ejected from the nailer is struck into the workpiece, passing through the guide shaft 25 and the insertion hole 3. At this time, the guide vanes 26 and the guide shaft 25 are outwardly spread by the head portion 41 of the fastener 40, and are squashed to escape toward the outer side of the head portion 41 of the fastener 40. Therefore, the guide member 20 less obstructive to the striking, and the penetrating amount of the fastener 40 can be sufficiently ensured. As a result, it is possible to firmly secure the hanging bracket 10 to the workpiece.

Figure 18:
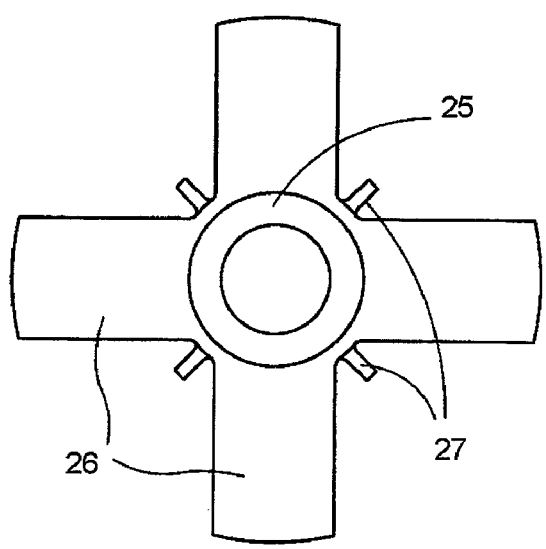
FIG. 18 is a plan view illustrating another example of a guide member.

The number of the guide vanes 26 and the guide pieces 27 is not restricted in so far as they are formed radially from the center of the guide shaft 25. For example, as shown in FIG. 18, four guide vanes 26 and four guide pieces 27 may be alternately provided.

Figure 19A:
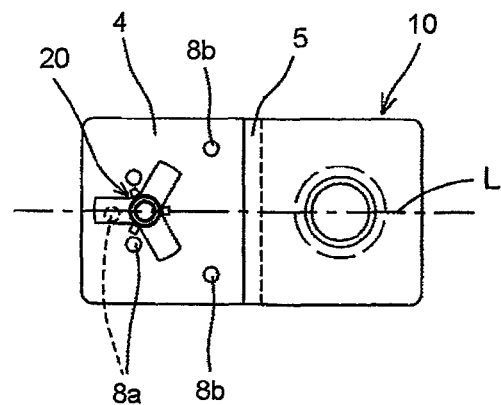
FIG. 19A is a plan view illustrating another example of the fixing.
Figure 19B:
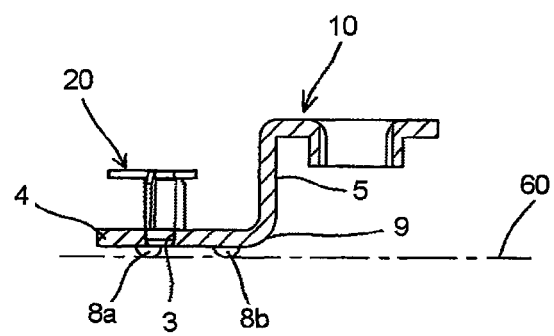
FIG. 19B is a sectional view of the fixing shown in FIG. 19A, taken along the center line L.
Figure 19C:
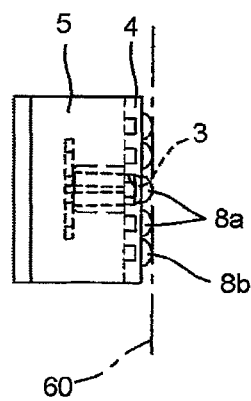
FIG. 19C is a right side view of the fixing shown in FIG. 19A.

The hanging bracket 10 secured to the workpiece, such as a concrete ceiling, is resistant to a force in an extracting direction, but when a force (a load) F is applied in a direction of an arrow in FIG. 17, it may rotate around the fastener 40. The hanging bracket 10 illustrated in FIGS. 19A to 19C is formed, on the surface that faces the surface 60 of the workpiece when secured to the surface 60 of the workpiece, with a plurality of anti-rotation protrusions 8a, 8b. The protrusions 8a, 8b may be formed by press working or the like.

The plurality of the protrusions 8a, 8b are provided in two regions, namely, a region near the insertion hole 3 of the hanging bracket 10 and a region sufficiently away from the insertion hole 3. Three protrusions 8a are provided near the insertion hole 3. One of the three protrusions 8a is provided on a longitudinal center line L of the hanging bracket 10, and the other two are provided at symmetrical positions on respective sides of the center line L.

While the number of the protrusions 8a is three and the number of the protrusions 8b is two in this example, they are not particularly limited in number. For example, two to four protrusions may be provided respectively, and may have an anti-rotation function.

The two protrusions 8b in the region sufficiently away from the insertion hole 3 are provided at symmetrical positions on respective sides the center line L with a sufficient interval therebetween and near the bent part 9 of the hanging bracket 10 between the step part 5 and the securing part 4.

Figure 20:
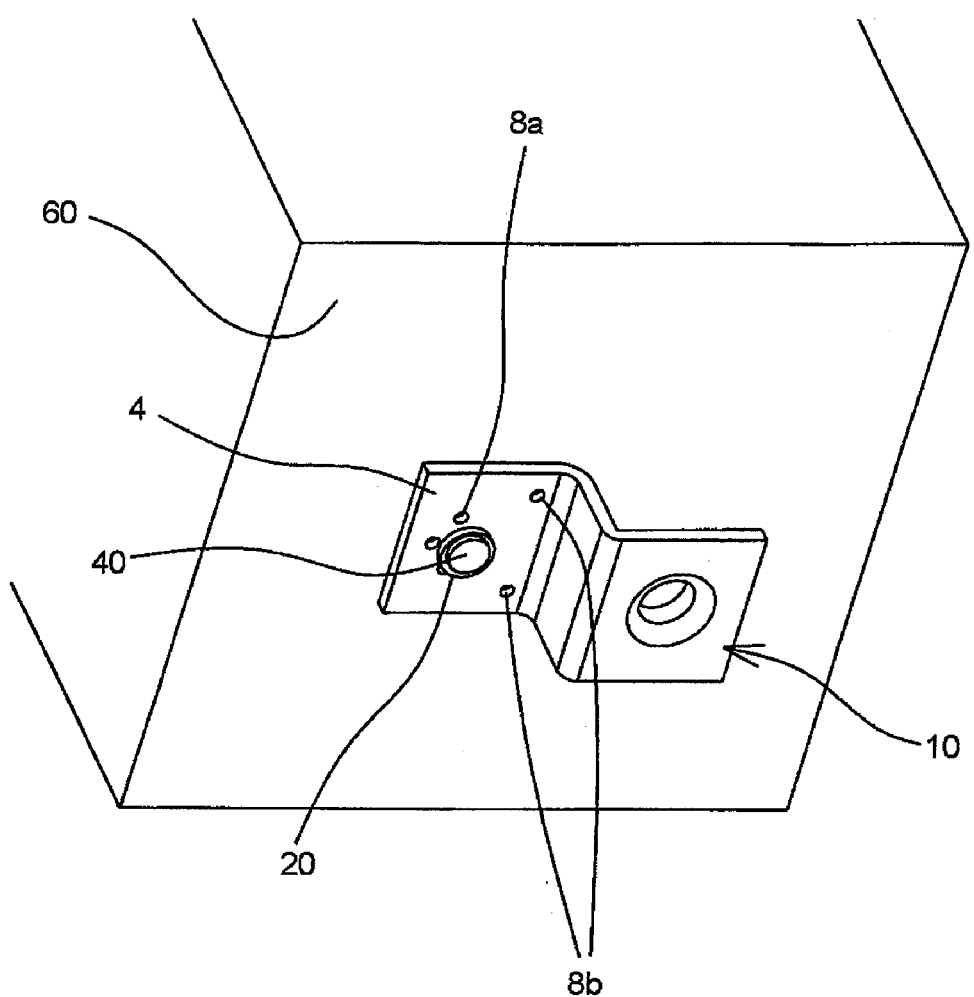
FIG. 20 is a perspective view illustrating the fixing shown in FIG. 19A secured to the workpiece.

As shown in FIG. 20, the hanging bracket 10 of this type is also secured to the surface 60 of the workpiece with the fastener 40, in a similar manner as the foregoing hanging bracket 10.

Figure 21A:
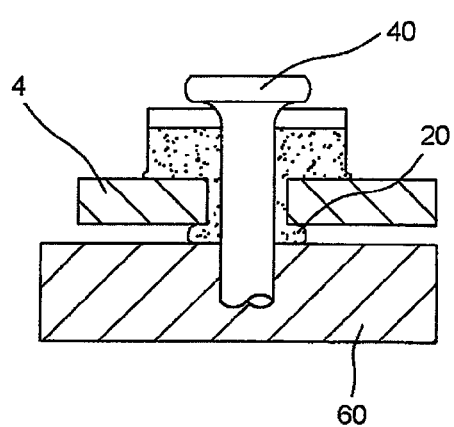
FIG. 21A is a sectional view illustrating a state in which the guide member is squashed and intruded between the fixing and the workpiece.
Figure 21B:
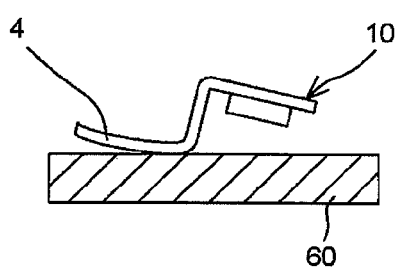
FIG. 21B is a side view of the fixing in a state in which a securing part is warped.

When the hanging bracket 10 is secured with the fastener 40, the surface of the securing part 4 facing the surface 60 of the workpiece may not firmly contact the surface 60 of the workpiece, in a case in which the guide member 20 is squashed to enter between the workpiece and the hanging bracket 10 (see FIG. 21A), the surface 60 of the workpiece is a rough concrete surface, or the surface of the securing part 4 facing the surface 60 of the workpiece is warped (see FIG. 21B). However, because the plurality of the anti-rotation protrusions 8a, 8b are formed on the surface of the securing part 4 that faces the surface 60 of the workpiece, the protrusions 8a, 8b are firmly pressed against the surface 60 of the workpiece as shown in FIGS. 19B and 19C. Thus, the hanging bracket 10 is strongly held by a frictional force, and does not rotate even when an external force is applied to rotate around the fastener 40. Therefore, a worker can be convinced that the hanging bracket 10 is firmly secured to the surface 60 of the workpiece, so that reliability is enhanced.

Moreover, because the plurality of the protrusions 8a, 8b are provided in the regions near the insertion hole 3 and away from the insertion hole 3 and the hanging bracket 10 is firmly held with the frictional force by a cooperation of these protrusions 8a, 8b, anti-rotation effect is high.

Figure 21C:
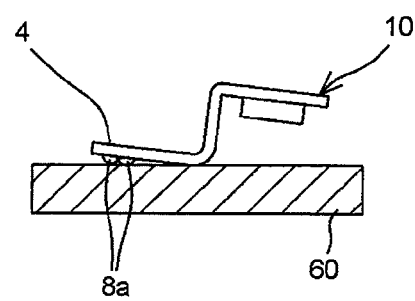
FIG. 21C is a side view of the fixing in an inclined state.
Figure 21D:
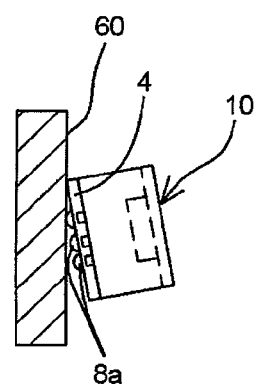
FIG. 21D is a front view of the fixing in an inclined state.

The plurality of the protrusions 8a provided near the insertion hole 3 are highly effective in anti-rotation, but are likely to cause the hanging bracket 10 to incline (see FIGS. 21C and 21D). In contrast, the plurality of the protrusions 8b provided in the region away from the insertion hole 3 are not that effective in anti-rotation, but are highly effective in stably holding the hanging bracket 10. Therefore, by arranging these protrusions 8a, 8b in a good balance, it is possible to effectively achieve the anti-rotation and the prevention of the inclination of the hanging bracket 10.

Further, because the plurality of protrusions 8a and protrusions 8b are respectively arranged on opposite sides of the insertion hole 3, the prevention of the rotation and the inclination of the hanging bracket 10 can be achieved more effectively.

Figure 8:
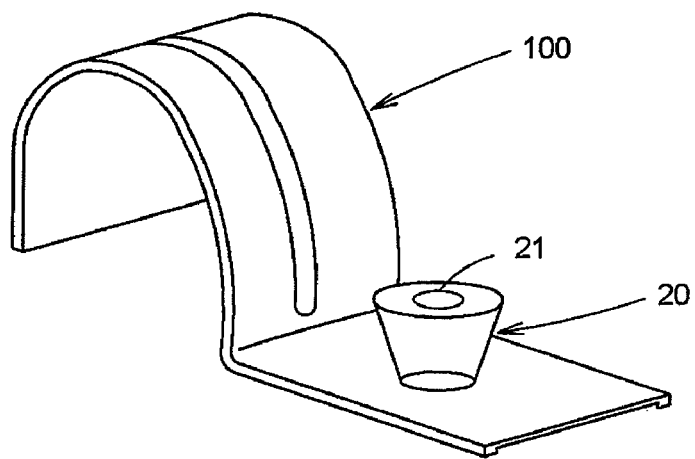
FIG. 8 is a perspective view of yet another example of the fixing.
Figure 9:
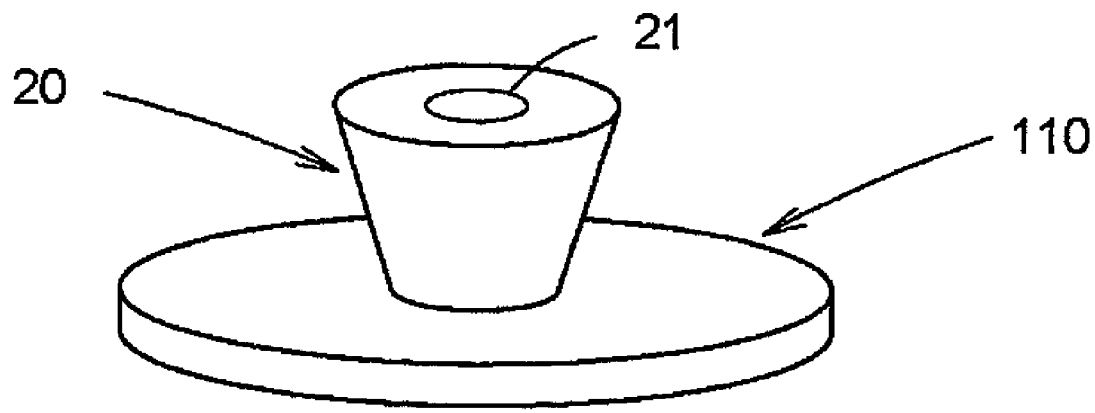
FIG. 9 is a perspective view of yet another example of the fixing.

While the Z-shaped hanging bracket 10 has been explained as an example of the fixing in the embodiments described above, the fixing may be a saddle band metal 100 shown in FIG. 8 or a washer 110 as shown in FIG. 9. Moreover, the fixing need not necessarily be made of metal, and may be made of resin.

Moreover, the surface of the workpiece to which the fixing is secured is not limited to a concrete surface of a ceiling. For example, the surface of the workpiece may be a wall surface or a floor surface. Further, the fastener may be a nail or a screw.

While embodiments of the present invention have been described above, it would be apparent to those skilled in the art that various modifications and changes can be made therein without departing from the sprit and scope of the present invention.

The present application is based on Japanese Patent Applications No. 2006-340591 filed on Dec. 18, 2006, No. 2007-033822 filed on Feb. 14, 2007, and No. 2007-139036 filed on May 25, 2007, the contents of which are incorporated herein by reference.

INDUSTRIAL APPLICABILITY

One or more embodiments of the present invention provide a fixing assembly which can be reliably held by a nose part at a distal end of a nailer to favorably guide a striking of a fastener, and which can be stably secured to a workpiece.

The invention claimed is:

1. A fixing assembly adapted to be secured to a workpiece with a fastener that is struck out from a nailer, the fixing assembly comprising:
   a fixing formed with an insertion hole through which the fastener is to be inserted;
   a plurality of protrusions formed on a surface of the fixing that faces the workpiece when secured to the workpiece, the plurality of protrusions including a first protrusion provided near the insertion hole and a second protrusion provided at a position away from the insertion hole; and
   a guide member comprising a base part fixed to the insertion hole and a guide part adapted to be elastically engaged with a nose part of the nailer,
   wherein an outer diameter of a distal end portion of the guide part is larger than an inner diameter of the nose part.

2. The fixing assembly according to claim 1, wherein the guide part comprises a guide shaft on which the base part is provided at one end and a plurality of flexible guide vanes radially formed from the other end of the guide shaft, and
   a diameter of a circle that connects distal ends of the plurality of guide vanes is larger than the inner diameter of the nose part.

3. The fixing assembly according to claim 2, wherein the guide part is adapted to receive a nose part which comprises an outer nose portion provided so as to be relatively movable with respect to a body of the nailer in a striking direction of the fastener and an inner nose portion fixed to the body of the nailer,
   the guide part further comprises a plurality of guide pieces formed on an outer peripheral face of the guide shaft,
   the diameter of the circle that connects the distal ends of the plurality of guide vanes is larger than an inner diameter of the outer nose portion, and
   a diameter of a circle that connects distal ends of the guide pieces is slightly smaller than the inner diameter of the outer nose portion.

4. The fixing assembly according to claim 3, wherein each of the guide pieces is formed between respective adjacent ones of the guide vanes.

5. The fixing assembly according to claim 1, wherein the guide member is formed with a guide hole adapted to guide the fastener.

6. The fixing assembly according to claim 5, wherein an inner diameter of the guide hole at the distal end portion of the guide part is larger than an outer diameter of a shaft portion of the fastener.

7. The fixing assembly according to claim 5, wherein the nose part comprises an outer nose portion provided so as to be relatively movable with respect to a body of the nailer in a striking direction of the fastener and an inner nose portion fixed to the body of the nailer, and an inner diameter of the guide hole at the distal end portion of the guide part is substantially equal to an inner diameter of a dist end of the inner nose portion.

8. The fixing assembly according to claim 1, wherein the first protrusion and the second protrusion are arranged at opposite sides of the insertion hole.

9. The fixing assembly according to claim 1, wherein the fixing is formed in a Z-shape and comprises a mounting part formed with a threaded hole, a securing part formed with the insertion hole, and a step part connecting the mounting part and the securing part.

10. The fixing assembly according to claim 1, wherein the guide part is formed in a flared shape.

11. The fixing assembly according to claim 1, wherein the guide part comprises a number of projecting pieces spreading obliquely and radially from the insertion hole.

12. The fixing assembly according to claim 1, wherein the guide part is adapted to be elastically engaged with an inner side of the nose part.

13. The fixing assembly according to claim 1, wherein the outer diameter of the distal end portion of the guide part is smaller than a dimension of the guide member in the striking direction of the fastener.

14. A fixing assembly adapted to be secured to a workpiece with a fastener that is struck out from a nailer, the fixing assembly comprising:
   a fixing formed with an insertion hole through which the fastener is to be inserted; and
   a guide member, the guide member comprising:
      a guide shaft;
      a base part provided on a first axial end of the guide shaft and fitted in the insertion hole;
      a plurality of flexible guide vanes extending outward in a radial direction of the guide shaft from a second axial end of the guide shaft, the second axial end of the guide shaft being a most distal axial end of the guide member; and
      a plurality of guide pieces extending outward in the radial direction from an outer peripheral face of the guide shaft,
   wherein a diameter of a circle that connects distal ends of the plurality of guide vanes is larger than a diameter of a circle that connects distal ends of the plurality of guide pieces, and
   the plurality of guide pieces comprises an inclined portion tapered toward the second axial end of the guide shaft and extending inward in the radial direction toward the second axial end of the guide shaft.

15. The fixing assembly according to claim 14, wherein the guide member is formed with a guide hole adapted to guide the fastener.

16. The fixing assembly according to claim 15, wherein an inner diameter of the guide hole at the second axial end of the guide shaft is larger than an outer diameter of a shaft portion of the fastener.

17. The fixing assembly according to claim 14, wherein each of the guide pieces is formed between respective adjacent ones of the guide vanes.

18. The fixing assembly according to claim 14, wherein the fixing is formed in a Z-shape and comprises a mounting part formed with a threaded hole, a securing part formed with the insertion hole, and a step part connecting the mounting part and the securing part.

* * * * *